United States Patent Office 2,844,576
Patented July 22, 1958

2,844,576

PREPARATION OF PURINES

Leon Goldman and Joseph W. Marsico, Nanuet, N. Y., assignors to American Cyanamid Company, New York, N. Y., a corporation of Maine No Drawing. Application November 22, 1955
Serial No. 548,534

11 Claims. (Cl. 260—254)

This invention relates to an improved process of preparing unsubstituted and 2- and/or 6-disubstituted purines.

Although 2,6-disubstituted purines have been prepared in accordance with several processes, the methods heretofore available are subject to numerous disadvantages from a commercial point of view. Baker et al. [Journal Organic Chemistry 19, 631 (1954)] prepared 6-dimethylaminopurine by desulfurization of 2-methylmercapto-6-dimethylaminopurine with Raney nickel, and by cyclization of 4-amino-5-formylamino-6-dimethylaminopyrimidine by heating in the dry state or in quinoline. Others have attempted to prepare purines with halogen substituents in the 2- and 6-positions, as for example, Robins et al. [Journal Organic Chemistry 19, 930 (1954)]. These workers reported that 2,6-dichloro-4-amino-5-formylaminopyrimidine loses chlorine on cyclization in accordance with the following equation:

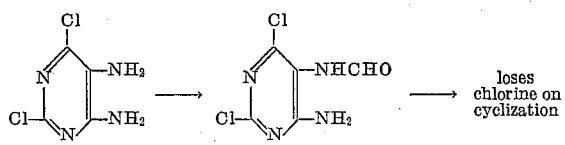
loses chlorine on cyclization

The same workers [Journal American Chemical Society, 75, 263 (1953)] attempted to synthesize 6-chloropurine by cyclization of 4,5-diamino-6-chloropyrimidine by conventional means, but instead obtained 6-hydroxypurine (hypoxanthine). Thus, the presently available methods are either expensive or limited in applicability.

We have now discovered a new method for the cyclization of a wide variety of unsubstituted and 2- and/or 6-disubstituted 4,5-diaminopyrimidines into the corresponding purine compounds. Our method is a distinct improvement over prior art methods in that it not only has a wide range of utility, but also enables the cyclization of pyrimidines to corresponding purines in high yields, and without loss of substituents.

The new method of our invention is suitable for the preparation of purines having the general formula:

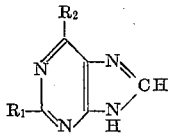

wherein $R_1$ and $R_2$ represent H or any organic or inorganic radical. Such substituents may vary widely in nature, inasmuch as they do not enter into the reaction comprising the process of this invention. The variation of substituents, irrespective of character, neither affects nor modifies the reaction in any way. The following is a partial list of types of substituents which have been found to be of value: halogen, for instance, Cl, Br, F, and I; alkyl radicals for instance, $CH_3$, $C_2H_5$, $C_3H_7$, $C_4H_9$, $C_5H_{11}$; alkoxy, aralkoxy and aryloxy radicals, for instance, —$OCH_3$, —$OC_2H_5$, —$OCH_2C_6H_5$ and —$OC_6H_5$; hydroxyl radicals; aryl radicals, for instance, phenyl and substituted phenyl; acyl radicals, for instance —COR in which R is hydrogen or a lower alkyl group; acyloxy radicals, for instance, —OCOR in which R may represent a lower alkyl group; carboxyl radicals (—COOH) and the esters, amides and salts thereof; mercapto (—SH) and substituted mercapto, for instance, alkyl mercapto, aralkyl mercapto and aryl mercapto such as —$SCH_3$, —$SC_2H_5$, —$SC_3H_7$, —$SCH_2C_6H_5$, —$SC_6H_5$; aralkyl such as benzyl and naphthylmethyl; cycloalkyl such as cyclohexyl, 3-methylcyclohexyl, 4-ethylcyclohexyl and 2-chlorocyclohexyl; amino (—$NH_2$) and substituted amino (mono- or di-) for instance, alkylamino, dialkylamino, arylamino, diarylamino, aralkylamino, alkarylamino, diaralkylamino, alkylaralkylamino, aralkylarylamino, 6-membered cyclicamino, and dicycloalkylamino. As examples may be given —$NHCH_3$, —$NHC_2H_5$, —$NHC_3H_7$ —$N(CH_3)_2$, —$N(C_2H_5)_2$, —$N(C_3H_7)_2$, —$NHC_6H_5$, —$NHC_6H_5Cl$, —$N(C_6H_5)_2$, —$N(C_6H_5Cl)_2$, —$NHCH_2C_6H_5$, —$N(CH_2C_6H_5)_2$,

morpholino and piperidino. Other types of useful substituents will be apparent to those skilled in the art, and it is intended that this invention cover a process for making compounds of the above formula wherein $R_1$ and $R_2$ represent any stable substituent or substituents having a reasonable number of constituent atoms, for instance less than about twenty, exclusive of hydrogen atoms.

In accordance with the method of the present invention, a 4,5-diaminopyrimidine is heated in the presence of a lower alkyl orthoformate, such as methyl orthoformate, ethyl orthoformate, propyl orthoformate, etc. with a lower alkanoyl anhydride, such as acetic anhydride, propionic anhydride, butyric anhydride, etc., so as to effect cyclization of the amino groups at the 4- and 5-positions, resulting in the formation of the second ring of the purine compound. This new reaction can be illustrated by the following equation:

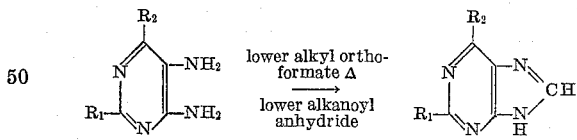

wherein $R_1$ and $R_2$ represent substituents on the 2- and 6-positions of the pyrimidine and purine rings as shown above.

The cyclization is preferably effected by heating the pyrimidine compound at a temperature of from about 100° C. to reflux temperature of the reaction mixture and which may range up to about 250° C. It is preferred, for better yields, that the reaction be conducted at reflux temperature.

The lower alkyl orthoformate used in the present reaction serves as a donor of the carbon atom in the 8-position of the purine ring during cyclization. The exact mechanism of the reaction is unknown and the present invention is not limited to any particular theory of action. It is believed, however, that the cyclization is effected through the formation of an intermediate compound. This intermediate is a derivative of the corresponding anhydride employed during the reaction. If, for example, acetic anhydride is employed, the intermediate acetyl derivative would have the following probable structural formula:

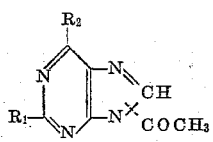

The compounds prepared by the novel method of the present invention, have wide application in the fields of chemistry and medicine. The compounds are useful as intermediates in the synthesis of biologically active aminonucleosides. For example, the compounds 6-dimethylaminopurine and 2-methylmercapto-6-dimethylaminopurine may be converted to the biologically active trypanosomicidal aminonucleoside 6 - dimethylamino - 9 - (3-amino-3-deoxy-β-D-ribofuranosyl)purine in accordance with procedure set forth by Baker et al. in application Serial No. 544,084, filed October 31, 1955. This method comprises reacting a chloromercuri derivative of the corresponding purine with a fully acylated haloamino sugar such as, for example, 2,5-di-O-benzoyl-3-phthalimido-3-deoxy-β-D-ribofuranosyl chloride. The product, after deacylation and desulfurization, may be interacted with the amino acid p-methoxy-L-phenylalanine (suitably blocked and converted to the mixed anhydride) to give after removal of the blocking group the biologically active 6-dimethylamino - 9 - [3 - (p - methoxy - L - β - phenylalanylamino)-3-deoxy-β-D-ribofuranosyl]purine more commonly referred to under its generic name as Puromycin. The compound puromycin is more particularly described and claimed in the patent to Porter et al. No. 2,763,642, issued September 18, 1956. This latter procedure is fully described by Baker et al. in the Journal of American Chemical Society, vol. 76, p. 2838 (1954).

As a further example of the usefulness of the compounds resulting from the process of the present invention may be given the conversion of 6-chloropurine to Nebularine, 9-β-D-ribofuranosylpurine, in accordance with the procedure of Brown et al. [Journal Biological Chemistry, 204, 1019 (1954)]. Nebularine is a compound known to be active against a variety of microorganisms, particularly those belonging to the genus Mycobacterium [Lofgren, Acta Chem. Scand. 8, 670 (1954)].

The invention will be described in greater detail in conjunction with the following specific examples in which the parts are by weight unless otherwise specified.

*Example 1*

A mixture of 0.5 part by weight of 4,5-diamino-6-chloropyrimidine, 5 parts by volume of ethyl orthoformate and 5 parts by volume of acetic anhydride was heated in an oil bath at 140° C. for one hour. The resulting solution was evaporated to dryness under reduced pressure and the residue was dissolved in sufficient cold 0.1 N sodium hydroxide to give a pH of about 8.5. After being allowed to stand at room temperature for about 15 minutes, the solution was filtered to remove a small amount of precipitate and the filtrate was adjusted to pH about 4.5 by the addition of 0.1 N hydrochloric acid. The resultant solution was extracted with ether in a continuous extractor for 8 hours. The ether extract, containing crystals, was evaporated to dryness under reduced pressure to yield 6-chloropurine, melting point 178° C. to 180° C. (dec.).

*Example 2*

A suspension of 2.37 parts by weight of 2,6-dichloro-4,5-diaminopyrimidine in 22 parts by volume of ethyl orthoformate and 22 parts by volume of acetic anhydride was refluxed for 2 hours and then evaporated to dryness under reduced pressure. The residual solid was stirred with 100 parts by volume of 1 N sodium hydroxide for about 15 minutes at room temperature and the resulting solution was filtered from a small amount of precipitate. The filtrate was chilled and the pH adjusted to 4.0 to 5.0 by the addition of concentrated hydrochloric acid. The resulting solution was extracted with ether and the ether extract was evaporated to dryness to give 2,6-dichloropurine as a yellow solid, melting point 166° C. to 174° C. Recrystallization from water gave colorless crystals having a melting point of 180° C. to 181.5° C.

*Example 3*

A mixture of 0.5 part by weight of 4,5-diamino-6-dimethylaminopyrimidine, 5 parts by volume of ethyl orthoformate, and 5 parts by volume of acetic anhydride was refluxed for two hours and then evaporated to dryness under reduced pressure. The residual gummy solid was heated on a steam bath for one-half hour with 10 parts by volume of 1 N sodium hydroxide and the resulting solution was filtered to remove a small amount of precipitate. The filtrate was neutralized with 10 parts by volume of 1 N hydrochloric acid and extracted with four, 15 parts by volume, portions of ethyl acetate. The ethyl acetate extract was evaporated to dryness under reduced pressure to give colorless crystals of 6-dimethylaminopurine having a melting point of 249° C. to 255° C. When recrystallized from chloroform, colorless crystals having a melting point of 257° C. to 257.5° C. were obtained.

*Example 4*

A mixture of 0.5 part by weight of 2-methylmercapto-4,5-diamino-6-dimethylaminopyrimidine, 5 parts by volume of ethyl orthoformate and 5 parts by volume of acetic anhydride was refluxed for 2¼ hours and then evaporated to dryness under reduced pressure. The residual solid was heated on a steam bath with 10 parts by volume of 1 N sodium hydroxide and the resulting solution was clarified by filtration through diatomaceous earth. Acetic acid was then added until the pH was about 3.8, producing colorless crystals. After chilling and filtering, 2-methylmercapto-6-dimethylaminopurine was obtained, melting point 278° C. to 281° C. (dec.). This was purified by dissolving in hot 1 N sodium hydroxide, filtering and acidifying with acetic acid to produce colorless crystals having a melting point of 285° C. to 286° C. (dec.).

*Example 5*

A mixture of 0.5 part by weight of 2,4,5-triamino-6-hydroxypyrimidine, 5 parts by volume of ethyl orthoformate and 5 parts by volume of acetic anhydride was refluxed for 2 hours by means of an oil-bath at 145–150° C. The resulting suspension was evaporated to dryness under reduced pressure to yield a yellow-tan residual solid. The residue was heated on a steam bath for 1 hour with 10 parts by volume of 1 N hydrochloric acid to produce a precipitate. Then 5 parts by volume of 6 N sulfuric acid was added, and the suspension was heated briefly on a steam bath, chilled and filtered. The light tan crystals were washed with water and dried at 100° C. for 2 hours, to yield a guanine sulfate hemihydrate, $\lambda_{max.}^{0.1\ NHCl}$ 248 m$\mu$($\epsilon$12,400), $\lambda_{max.}^{0.1\ NaOH}$ 273 m$\mu$($\epsilon$9,760)

*Example 6*

A mixture of 0.5 part by weight of 2-methylmercapto-4,5-diamino-6-dimethylaminopyrimidine, 5 parts by volume of ethyl orthoformate and 5 parts by volume of propionic anhydride was refluxed for 2 hours by means of an oil-bath at 145–150° C. The resulting solution was evaporated to dryness under reduced pressure to yield a residual solid which was heated on a steam-bath for 10 minutes with 10 parts by volume of 1 N sodium hydroxide. Addition of 1 N hydrochloric acid produced crystals which, after chilling, were removed by filtration and washed with water to yield 2-methylmercapto-6-dimethylaminopurine, melting point 265–267° C. (dec.).

Example 7

2-methylmercapto-4,5-diamino-6-dimethylaminopyrimidine, 0.5 part by weight, was reacted with 5 parts by volume of ethyl orthoformate and 5 parts by volume of n-butyric anhydride as in Example 6, to yield 2-methylmercapto-6-dimethylaminopurine, melting point 279–282° C. (dec.).

Example 8

2-methylmercapto-4,5-diamino-6-dimethylaminopyrimidine, 0.5 part by weight, was reacted with 5 parts by volume of methyl orthoformate and 5 parts by volume of acetic anhydride as in Example 6, to yield 2-methylmercapto-6-dimethylaminopurine, melting point 281.5–284° C.

Example 9

2-methylmercapto-4,5-diamino-6-dimethylaminopyrimidine, 0.5 part by weight, was reacted with 5 parts by volume of n-propyl orthoformate and 5 parts by volume of acetic anhydride as in Example 6, to yield 2-methylmercapto-6-dimethylaminopurine, melting point 280–284° C. (dec.).

Example 10

A mixture of 0.5 part by weight of 2-methyl-4,5-diamino-6-chloropyrimidine, 5 parts by volume of ethyl orthoformate and 5 parts by volume of acetic anhydride was refluxed for 2 hours by means of an oil-bath at 145–150° C. The resulting amber solution was evaporated to dryness under reduced pressure. A solution of the residual solid in 10 parts by volume of 1 N sodium hydroxide was allowed to stand at room temperature for 15 minutes, filtered to remove a small amount of precipitate, and brought to pH 3 by the addition of 10 parts by volume of 1 N hydrochloric acid. The resulting solution was extracted with ether in a continuous extractor, and the ether extract was evaporated to dryness under reduced pressure to yield 2-methyl-6-chloropurine, as a colorless crystalline residue, melting point 206–207° C. (dec.).

Example 11

A mixture of 0.5 part by weight of 2-methylmercapto-4,5-diamino-6-pyrimidinol, 10 parts by volume of ethyl orthoformate and 10 parts by volume of acetic anhydride was refluxed for 2 hours and the resulting solution was chilled and filtered to yield tan crystals. The filtrate was evaporated under reduced pressure to a residual tan glass which was triturated with ether and filtered. The combined crystals were heated on a steam-bath for 15 minutes with 10 parts by volume of 1 N sodium hydroxide, and the resulting solution was chilled, acidified with acetic acid, and filtered to yield 2-methylmercapto-6-purinol as an amorphous solid, melting point 253–257° C. Recrystallization from water gave colorless crystals of pure product, melting point 289–291° C.

Example 12

2-methyl-4,5-diamino-6-dimethylaminopyrimidine, 0.5 part by weight, was reacted with 5 parts by volume of ethyl orthoformate and 5 parts by volume of acetic anhydride as in Example 1. Recrystallization of the crude product from alcohol gave pure 2-methyl-6-dimethylaminopurine, melting point 281–282° C.

This application is in part a continuation of our co-pending application Serial No. 469,828, filed November 18, 1954, now abandoned.

We claim:

1. The method of preparing purines of the formula:

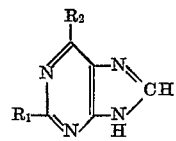

wherein $R_1$ and $R_2$ are members selected from the group consisting of halogen, hydroxy, amino, lower alkyl, di-lower alkylamino, and lower alkyl mercapto which comprises heating 4,5-diaminopyrimidine of the formula:

wherein $R_1$ and $R_2$ have the meaning hereinbefore assigned with a lower alkyl orthoformate in the presence of a lower alkanoyl anhydride.

2. The method as in claim 1 in which the anhydride is acetic anhydride.

3. The method as in claim 1 in which the anhydride is propionic anhydride.

4. The method as in claim 1 in which the anhydride is n-butyric anhydride.

5. The method as in claim 1 in which the orthoformate is methyl orthoformate.

6. The method as in claim 1 in which the orthoformate is ethyl orthoformate.

7. The method as in claim 1 in which the orthoformate is n-propyl orthoformate.

8. The method of preparing 6-chloropurine which comprises heating 4,5-diamino-6-chloropyrimidine with ethyl orthoformate in the presence of acetic anhydride.

9. The method of preparing 2,6-dichloropurine which comprises heating 2,6-dichloro-4,5-diaminopyrimidine with ethyl orthoformate in the presence of acetic anhydride.

10. The method of preparing 6-dimethylaminopurine which comprises heating 4,5-diamino-6-dimethylaminopyrimidine with ethyl orthoformate in the presence of acetic anhydride.

11. The method of preparing 2-methylmercapto-6-dimethylaminopurine which comprises heating 2-methylmercapto-4,5-diamino-6-dimethylaminopyrimidine with ethyl orthoformate in the presence of acetic anhydride.

References Cited in the file of this patent

UNITED STATES PATENTS

| | | |
|---|---|---|
| 2,691,654 | Hitchings et al. | Oct. 12, 1954 |
| 2,697,709 | Hitchings et al. | Dec. 21, 1954 |

FOREIGN PATENTS

| | | |
|---|---|---|
| 713,259 | Great Britain | Aug. 11, 1954 |

OTHER REFERENCES

Baker et al.: J. Org. Chem. 19, 631–45 (1954).
Backer et al.: Rec. Trav. Chim. 68, 247–52 (1949).
Fischer: Untersuchungen in der Puringruppe, page 63.
Whitmore: Organic Chemistry, pages 70, 123, 126, 280, 2nd ed. (1951).